US010926343B2

(12) United States Patent
Rakurty et al.

(10) Patent No.: US 10,926,343 B2
(45) Date of Patent: Feb. 23, 2021

(54) GROUND SET SAW BLADE

(71) Applicant: The M. K. Morse Company, Canton, OH (US)

(72) Inventors: Chandra Sekhar Rakurty, North Canton, OH (US); Peter Christopher Vandervaart, North Canton, OH (US)

(73) Assignee: THE M. K. MORSE COMPANY, Canton, OH (US)

( * ) Notice: Subject to any disclaimer, the term of this patent is extended or adjusted under 35 U.S.C. 154(b) by 11 days.

(21) Appl. No.: 15/834,565

(22) Filed: Dec. 7, 2017

(65) Prior Publication Data
US 2018/0099341 A1 Apr. 12, 2018

Related U.S. Application Data

(63) Continuation-in-part of application No. 15/132,305, filed on Apr. 19, 2016, now Pat. No. 10,279,408.

(51) Int. Cl.
B23D 61/12 (2006.01)
B23D 65/00 (2006.01)
B23D 61/14 (2006.01)

(52) U.S. Cl.
CPC ......... B23D 61/121 (2013.01); B23D 61/123 (2013.01); B23D 61/14 (2013.01); B23D 65/00 (2013.01)

(58) Field of Classification Search
CPC ...... B23D 61/00; B23D 61/12; B23D 61/121; B23D 61/122; B23D 61/123; B23D 61/125; B23D 61/126; B23D 61/025; B23D 61/021
See application file for complete search history.

(56) References Cited

U.S. PATENT DOCUMENTS

| 14,305 | A | * | 2/1856 | Coffin | B23D 61/121 |
| | | | | | 83/846 |
| 2,635,327 | A | | 4/1953 | Enlow | |
| 2,763,298 | A | * | 9/1956 | Tomkies | B27B 33/02 |
| | | | | | 83/851 |
| 2,849,037 | A | | 8/1958 | Wright | |
| 3,005,478 | A | * | 10/1961 | Laviano | B23D 61/121 |
| | | | | | 30/123 |
| 3,110,952 | A | | 11/1963 | Anderson | |
| 3,736,828 | A | | 6/1973 | Funakubo | |
| 3,973,455 | A | | 8/1976 | Slaats et al. | |
| 4,060,880 | A | * | 12/1977 | Nowak | B23D 61/021 |
| | | | | | 407/61 |
| 4,179,967 | A | * | 12/1979 | Clark | B23D 61/12 |
| | | | | | 83/661 |
| 4,212,568 | A | | 7/1980 | Minicozzi | |
| 4,265,285 | A | * | 5/1981 | Fodor | B23D 61/121 |
| | | | | | 30/166.3 |

(Continued)

*Primary Examiner* — Andrea L Wellington
*Assistant Examiner* — Richard D Crosby, Jr.
(74) *Attorney, Agent, or Firm* — Black, McCuskey, Souers & Arbaugh LPA

(57) ABSTRACT

A saw blade includes a blade backer with a pair of side surfaces that extend substantially parallel to each other. An intermediate surface extends between the pair of side surfaces of the blade backer. A plurality of teeth extends from the intermediate surface. The plurality of teeth includes an asymmetrically ground tooth tip having a first rake face angle and a symmetrically ground tooth tip having a different, second rake face angle.

20 Claims, 5 Drawing Sheets

(56) References Cited

U.S. PATENT DOCUMENTS

| | | | |
|---|---|---|---|
| 4,339,977 A * | 7/1982 | Miller | B23D 61/121 83/848 |
| RE31,433 E | 11/1983 | Clark | |
| 4,423,553 A * | 1/1984 | Miyawaki | B23D 61/121 30/355 |
| 4,604,933 A * | 8/1986 | Lesher | B23D 61/021 83/839 |
| 4,640,172 A * | 2/1987 | Kullmann | B23Q 11/0039 83/835 |
| 4,721,421 A | 1/1988 | Klinger | |
| 5,331,876 A | 7/1994 | Hayden, Sr. | |
| 5,425,296 A * | 6/1995 | Kullmann | B23D 61/021 83/676 |
| 5,477,763 A * | 12/1995 | Kullman | B23D 61/021 83/846 |
| 5,697,835 A * | 12/1997 | Nitz | B23D 61/006 125/15 |
| 6,119,571 A * | 9/2000 | Hayden, Sr. | B23D 61/121 83/661 |
| 6,158,324 A * | 12/2000 | Kullmann | B23D 61/021 408/206 |
| 6,220,139 B1 * | 4/2001 | Kobayashi | B23D 61/121 83/835 |
| 6,257,226 B1 * | 7/2001 | Hayden, Sr. | B23D 61/021 125/22 |
| 6,276,249 B1 * | 8/2001 | Handschuh | B23D 61/121 83/846 |
| 6,520,722 B2 | 2/2003 | Hopper et al. | |
| 6,598,509 B2 | 7/2003 | Cook et al. | |
| 6,829,973 B1 * | 12/2004 | Yang | B23D 61/021 30/166.3 |
| 7,036,415 B2 * | 5/2006 | Tsujimoto | B23D 61/121 83/661 |
| 7,121,180 B2 | 10/2006 | Shimofurutani | |
| 7,661,347 B2 | 2/2010 | Nagano et al. | |
| 8,113,100 B1 * | 2/2012 | Cranna | B23D 61/121 83/661 |
| 8,695,470 B2 * | 4/2014 | Kullmann | B23D 61/021 83/661 |
| 9,038,512 B2 | 5/2015 | Horiguchi et al. | |
| 9,162,299 B2 | 10/2015 | Kullmann et al. | |
| 10,112,245 B2 * | 10/2018 | Hunter | B23D 61/123 |
| 2001/0015120 A1 * | 8/2001 | Hickey | B23D 61/121 83/661 |
| 2002/0067963 A1 * | 6/2002 | Hopper | B23D 61/021 407/42 |
| 2003/0089215 A1 * | 5/2003 | Alton | B23D 61/121 83/848 |
| 2003/0121391 A1 * | 7/2003 | Knebel | B23C 5/08 83/847 |
| 2007/0199416 A1 * | 8/2007 | Cook | B23D 61/121 83/13 |
| 2008/0292415 A1 * | 11/2008 | Kuroda | B23B 27/145 407/61 |
| 2011/0132168 A1 * | 6/2011 | Nagano | B23D 61/121 83/661 |
| 2011/0154970 A1 * | 6/2011 | Oshibe | B23D 61/121 83/835 |
| 2011/0259168 A1 * | 10/2011 | Butzen | B23D 61/121 83/835 |
| 2012/0000338 A1 * | 1/2012 | Elliston | B23D 61/121 83/848 |
| 2012/0042765 A1 * | 2/2012 | Kazda | B23D 49/11 83/835 |
| 2012/0090443 A1 * | 4/2012 | Butzen | B23D 61/121 83/849 |
| 2012/0279372 A1 * | 11/2012 | Kullmann | B23D 61/121 83/846 |
| 2013/0133500 A1 * | 5/2013 | Horiguchi | B23D 61/121 83/661 |
| 2013/0174701 A1 * | 7/2013 | Elliston | B23D 61/126 83/34 |
| 2013/0228059 A1 * | 9/2013 | Kazda | B23D 61/121 83/835 |
| 2014/0260880 A1 * | 9/2014 | Hampton | B23D 61/121 83/835 |
| 2014/0260882 A1 * | 9/2014 | Elliston | B23D 61/121 83/847 |
| 2015/0075675 A1 * | 3/2015 | Andersson | B27F 1/02 144/371 |
| 2015/0190871 A1 * | 7/2015 | Dexter | B23D 61/121 83/851 |
| 2017/0297124 A1 * | 10/2017 | Rakurty | B23D 61/121 |
| 2018/0099341 A1 * | 4/2018 | Rakurty | B23D 61/14 |

* cited by examiner

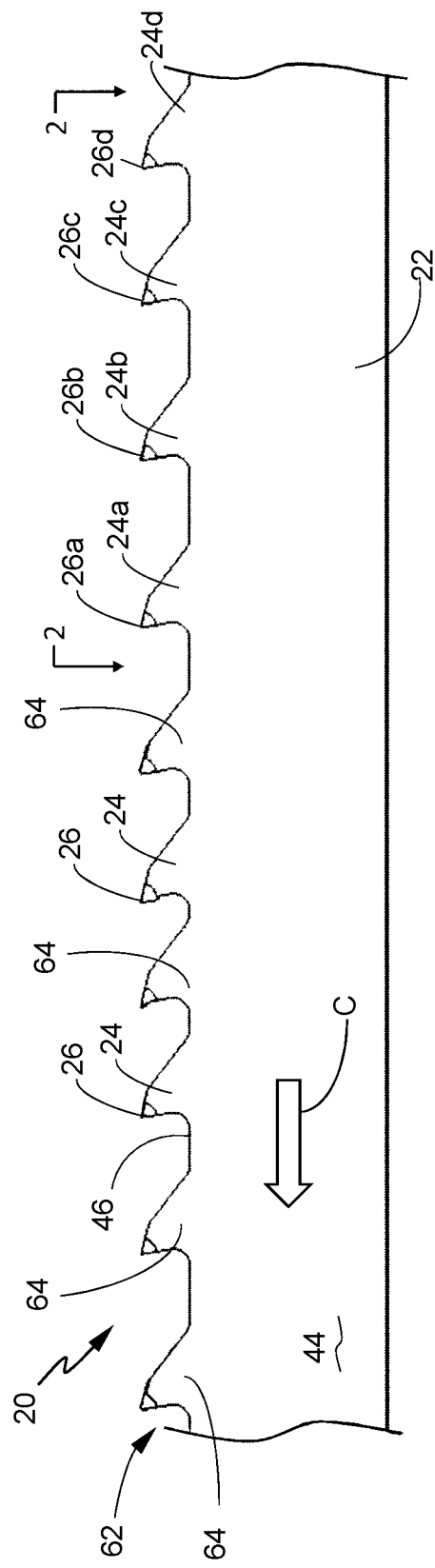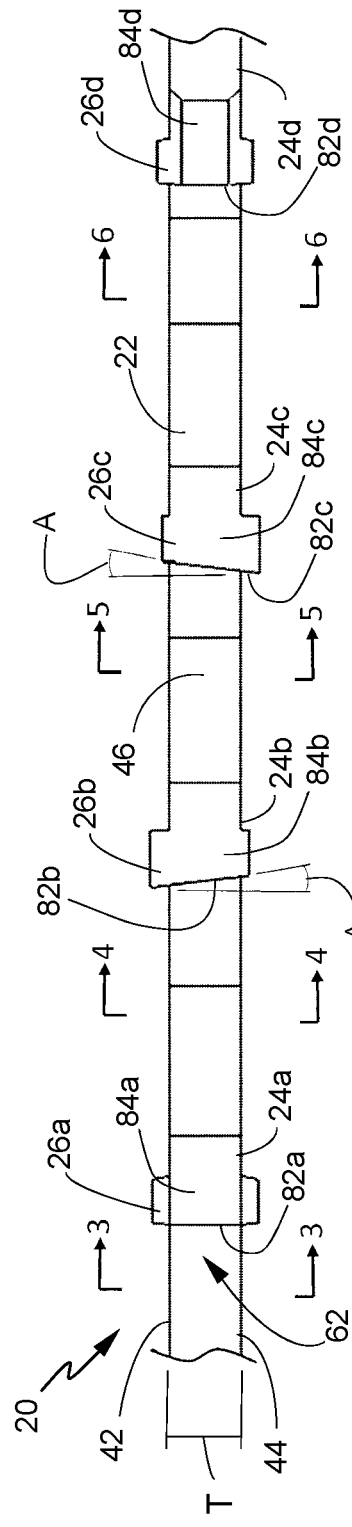

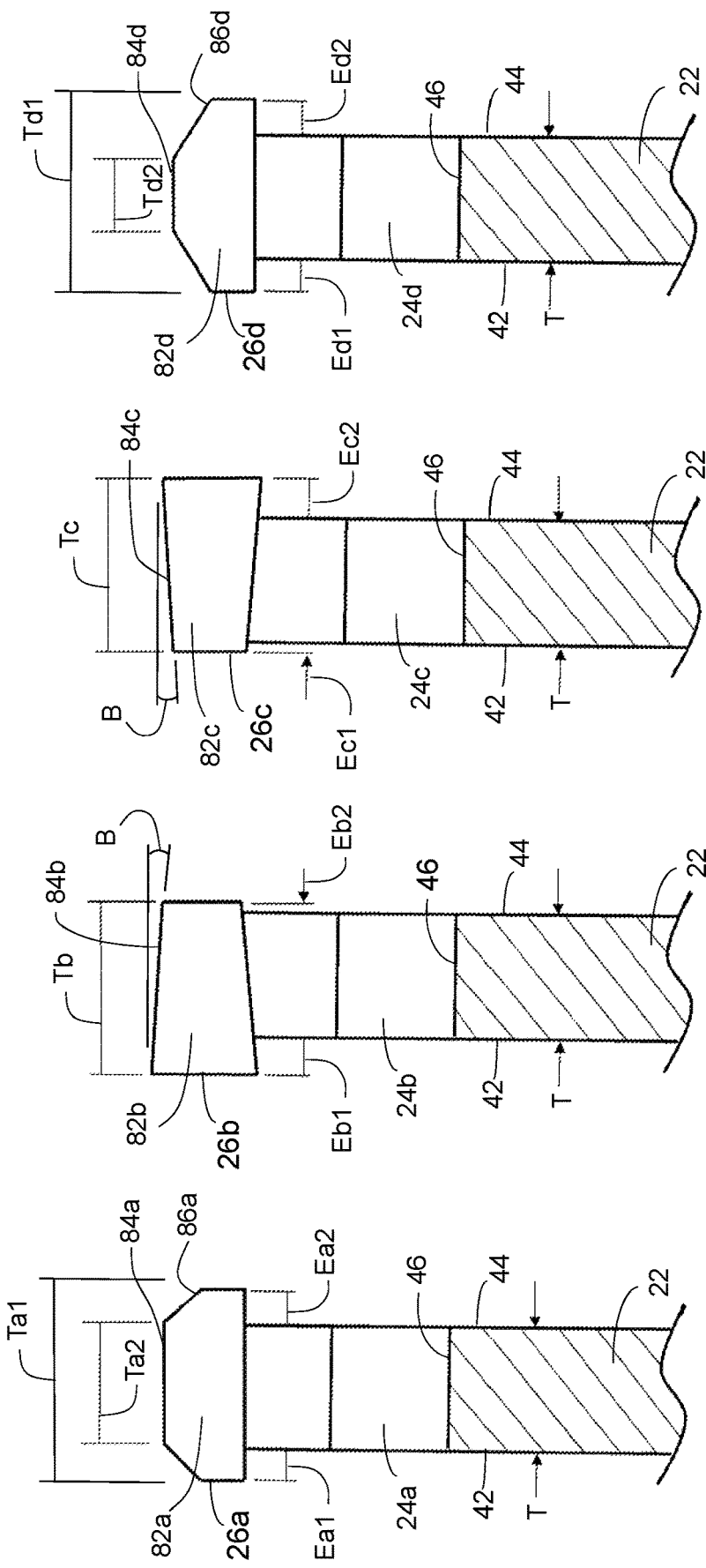

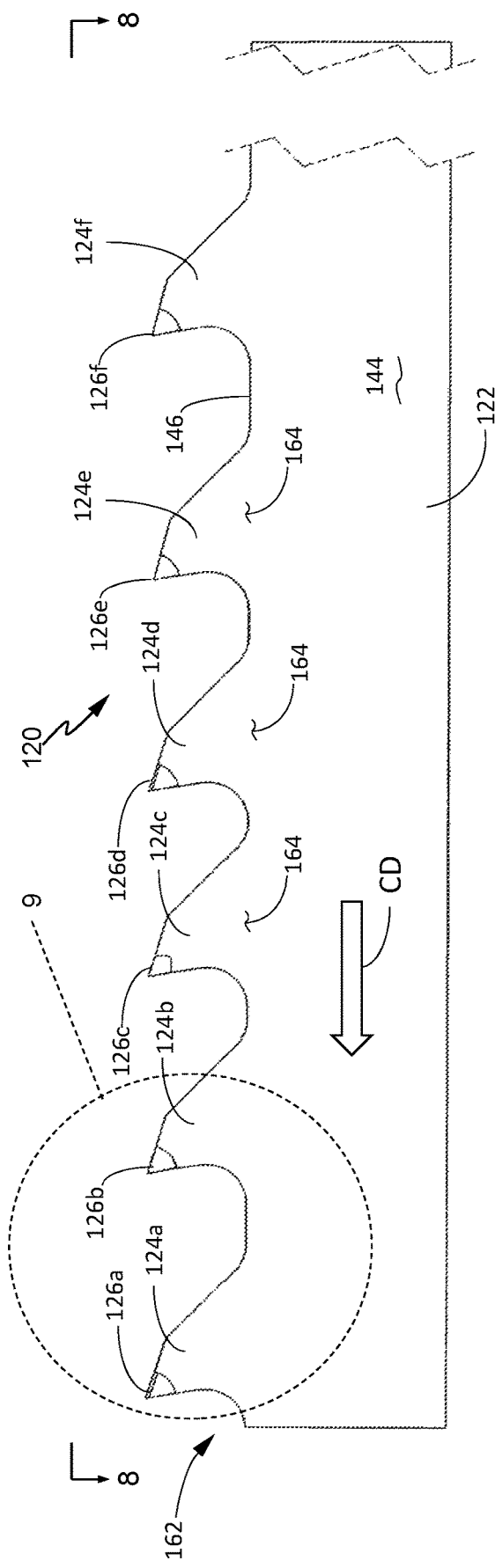
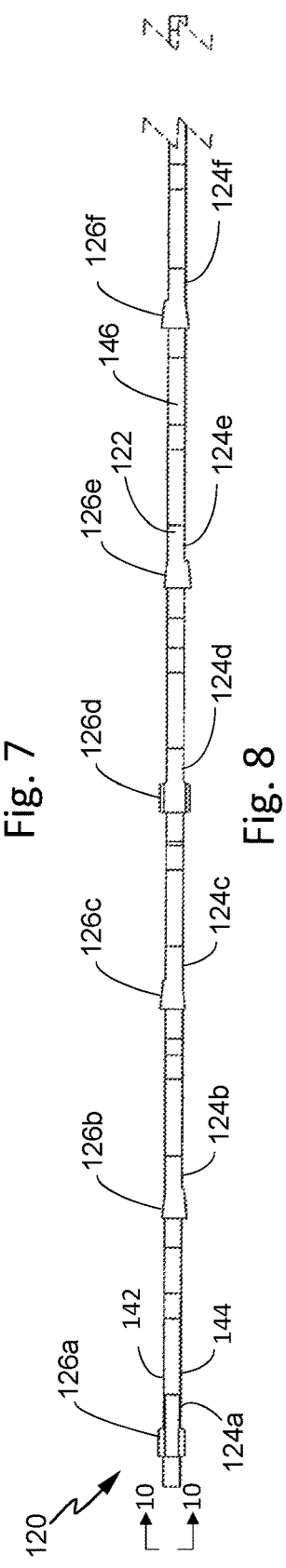
Fig. 7
Fig. 8

GROUND SET SAW BLADE

CROSS-REFERENCE TO RELATED APPLICATION

This non-provisional application is a continuation-in-part of U.S. application Ser. No. 15/132,305, filed on Apr. 19, 2016.

BACKGROUND OF THE INVENTION

Technical Field

This invention relates generally to cutting tools or implements, such as a cutting blade with a cutting edge. In particular, this relates to cutting implements, such as a saw having a toothed blade.

Background

A saw, such as a band saw having a saw blade, is typically employed to cut various materials including metallic and wooden objects. The saw blade includes a blade backer of a certain thickness. A cutting edge is formed on the blade backer. The cutting edge has a plurality of teeth.

There are a number of characteristics for a saw blade that manufacturers attempt to control to provide a saw blade appropriate for a particular application. A variety of approaches are used to achieve the desired saw blade characteristics. The approaches include selecting the materials used to manufacture the blade and designing the profiles of the saw blade teeth. For example, manufactures may incorporate relatively hard materials, such as carbide, bi-metal, cermet, ceramic, diamond, or the like, into the tips of blade teeth. Because such hard materials are relatively expensive, incorporating the material only into the blade tip allows manufactures to achieve the desired characteristics of the saw blade, while minimizing cost of blade production.

In order to incorporate the selected hard material into the tooth tip, a pellet of the selected hard material is first welded to an apex of each blade tooth. Once the pellet of the selected material is welded to the tooth apex, blade manufactures grind the tooth tip. The welded material on the tooth tip typically has a width that is slightly greater than the width of the tooth and blade. The sides of the tip are typically then ground to a tip width that is essentially the same as width or thickness of the tooth and blade backer.

Blade kerf is the overall width of the cut on a workpiece as the saw blade advances through the workpiece. Generally, it is desirable to have a kerf that is relatively wider than the thickness of the tooth and blade backer, while cutting certain materials. In order to increase the kerf width, blade manufacturers transversely or laterally position portions of the teeth including their tips to locations outside of the thickness or path of travel of the blade backer by a process known as mechanical setting.

The rake angle is the angle that is formed between the tooth face and a line perpendicular to the cutting direction of the blade. A positive rake angle is less than 90 degrees in relation to that perpendicular line and a negative rake angle is more than 90 degrees in relation to that line. The variation in rake angle is a function of the amount of material to be removed, which is a function of tooth spacing and tooth height. Just like the blade kerf, the rake angle is mechanically set.

To increase blade kerf and set the rake face angle by mechanical setting, the orientation of the teeth relative to the blade backer are mechanically repositioned by applying a force on either side of each individual tooth. The force plastically deforms the tooth so that the tooth tip is transversely or laterally offset relative to the longitudinal extent of the blade backer or the direction of cutting action travel on the side opposite to the impact. Based on the blade characteristics desired, the individual teeth can be offset to the either side of the blade backer, with a repeating and/or alternating pattern.

It is desirable to try to control the overall tooth offset of a given blade to ensure that the kerf is precise and uniform over the entire length of the blade. While mechanical setting allows blade manufactures to increase blade kerf, the distance that the teeth are offset from the blade backer as a result of the impact force may not be as controlled as may be desired for a quality cut finish and for even wear of the teeth. There are also physical and manufacturing limits as to how far the teeth can be offset. Furthermore, mechanically setting the blade teeth adds an additional processes step to the manufacturing process, which in turn increases blade manufacturing costs, production scheduling and lead time.

Thus, there is a need for a saw blade that overcomes the limitations, drawbacks, and disadvantages of known saw blades and known methods of manufacturing. The saw blade of this disclosure and method of making a saw blade satisfy these needs.

SUMMARY

An improved saw blade and manufacturing method are provided in which a hard material is incorporated into the blade teeth tips. The tips are ground set to yield a relatively controlled, consistent and precise blade kerf and rake angle. Controlled, consistent and precision ground setting individual teeth in the saw blade eliminates the need to mechanically set the teeth, thereby eliminating a step in the blade manufacturing process and decreasing associated manufacturing costs.

According to one aspect, a saw blade comprises a blade backer with a pair of side surfaces that extend substantially parallel to each other. An intermediate surface extends between the pair of side surfaces of the blade backer. A plurality of teeth extends from the intermediate surface. At least one of the teeth is located entirely within planes containing the side surfaces of the blade backer. A tip is formed at an apex end portion of the one tooth. A leading face surface of the tip on the one tooth is disposed at an acute angle relative to a plane extending perpendicular to the planes containing the side surfaces of the blade backer.

The intermediate surface extends in a direction perpendicular to the side surfaces and a top surface of the tip on the one tooth is disposed at an acute angle relative to the intermediate surface of the blade backer. The tip has laterally opposite end portions. At least one of the end portions extends outwardly beyond one of the planes containing the side surfaces of the blade backer.

Alternatively, both laterally opposite end portions of the tip extend outwardly beyond a respective plane containing the side surfaces of the blade backer. A first end portion of the tip may extend a first distance outwardly from a plane containing one of the side surfaces of the blade backer that is greater than a second distance that a second end portion of the tip extends outwardly from the plane containing the other of the side surfaces of the blade backer. The first end portion of the tip may extend a first distance outwardly from a plane containing one of the side surfaces of the blade backer that is substantially the same as a second distance that a second end portion of the tip extends outwardly from the plane containing the other of the side surfaces of the blade backer.

According to another aspect, a method of manufacturing a tooth of a cutting implement includes providing a backer having a pair of side surfaces extending substantially parallel to each other and an intermediate surface extending between the pair of side surfaces. A tooth portion is formed on the intermediate surface. The tooth portion is located entirely within planes containing the side surfaces of the backer. A tip is welded to an apex of the tooth portion and has laterally opposite end portions. A leading face surface of the tip is ground at an angle relative to a plane extending perpendicular to the planes containing the side surfaces of the backer.

According to yet another aspect, a saw comprises a blade backer having a pair of side surfaces extending substantially parallel to each other with an intermediate surface extending between the pair of side surfaces of the blade backer. A plurality of teeth from the intermediate surface. The plurality of teeth comprises an asymmetrically ground tooth tip having a first rake face angle and a symmetrically ground tooth tip having a second rake face angle. The first and second rake angles are different.

The first rake face angle is greater than the second rake face angle. The first rake face angle may be in a range of about 10-14 degrees. The second rake face angle may be in a range of about 5-9 degrees. A tooth height may be in a range from about 0.334 inch to about 0.342 inch for a 0.75/1 TPI saw blade, from about 0.235 inch to about 0.239 inch for a 1.5/2 TPI saw blade, from about 0.134 inch to about 0.139 inch for a ⅔ TPI saw blade, and from about 0.133 inch to about 0.139 inch for a ¾ TPI saw blade. The tips are welded to a tooth and made from a material such as carbide, bi-metal, cermet, ceramic, and diamond.

Laterally opposite tooth tip sides define at least a portion of an asymmetrically ground tooth tip. At least one of the tooth tip sides may extend outwardly beyond a plane containing the side surfaces of the blade backer. Both laterally opposite tooth tip sides of the asymmetrically ground tooth tip may extend outwardly beyond the plane containing the side surfaces of the blade backer.

A first end portion of a tooth tip of the asymmetrically ground tooth tip may extend a first distance outwardly from the plane containing one of the side surfaces of the blade backer that is greater than a second distance that a second side portion of the tooth tip extends outwardly from the plane containing the other of the side surfaces of the blade backer. The first portion of the tip of the symmetrically ground tooth tip may extend a first distance outwardly from the plane containing one of the side surfaces of the blade backer that is substantially the same as a second distance that a second side portion of the tip extends outwardly from the plane containing the other of the side surfaces of the blade backer.

DESCRIPTION OF THE DRAWINGS

Exemplary aspects are illustrated and described below. The aspects apply non-limiting concepts and are set forth in the following description and are illustrated in the drawings in which similar reference numbers throughout the drawings refer to similar parts and concepts, wherein:

FIG. 1 is a side elevational view of a partial section of a saw blade according to an exemplary aspect;

FIG. 2 is a plan view of a portion of the partial section of the saw blade in FIG. 1, taken approximately along line 2-2 of FIG. 1, illustrating exemplary relationships of various tooth tips on the saw blade;

FIG. 3 is an enlarged cross-sectional view of the saw blade in FIG. 2, taken approximately along line 3-3 of FIG. 2, illustrating a tooth structure according to one aspect;

FIG. 4 is a view similar to FIG. 3 and taken approximately along line 4-4 of FIG. 2, illustrating a tooth structure according to another aspect;

FIG. 5 is a view similar to FIG. 3 and taken approximately along line 5-5 of FIG. 2, illustrating a tooth structure according to another aspect;

FIG. 6 is a view similar to FIG. 3 and taken approximately along line 6-6 of FIG. 2, illustrating a tooth structure according to yet another aspect;

FIG. 7 is a side elevational view of a partial section of a saw blade according to another exemplary aspect;

FIG. 8 is a plan view of a portion of the partial section of the saw blade in FIG. 7, taken approximately along line 8-8 of FIG. 7, illustrating the various tooth tips in the ground set pattern on the saw blade;

DESCRIPTION

Figure 9:
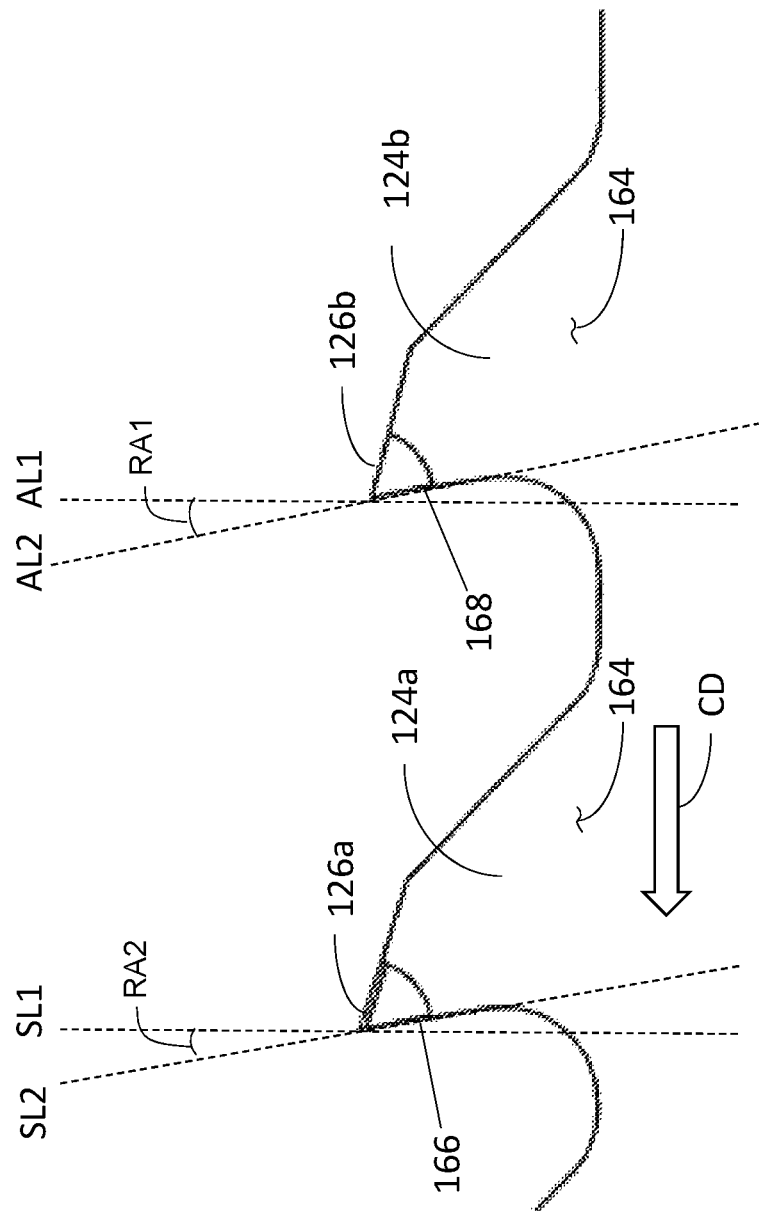
FIG. 9 is an enlarged side elevational view of two teeth of a saw blade in FIG. 7, taken approximately from the highlighted area 9 of FIG. 7.

A cutting tool or implement, according to one aspect, is depicted as an exemplary saw blade 20 (FIGS. 1 and 2) with a unique tooth tip construction and improved performance over previously known cutting implements. An improved method of making the saw blade is also disclosed according to another aspect. The saw blade 20 achieves improved cut finish and even tooth wear. The saw blade 20 has tooth tips that are angle ground set only which allows controlled, consistent and precise tip profile customization flexibility advantages over mechanically set blades and eliminates the mechanical setting process entirely.

The saw blade 20 includes a blade backer 22. Multiple individual teeth, generally indicated by reference number 24, are integrally formed on the blade backer 22. The saw blade 20 advances in a cutting direction C so the teeth 24 can remove material from a workpiece. Tips, generally indicated by reference number 26, are formed on respective individual teeth 24. Each of the tips 26 is precisely and consistently ground relative to the blade backer 22.

A more controlled, precise and consistent kerf and rake angle of each tooth than those of previously known cutting implements is possible with the saw blade 20. This provides a desirably better finish on a cut surface of the workpiece and consistent wear on every tooth 24 of the saw blade 20. The more controlled, precise and consistent kerf and rake angle is established by the construction of the tips 26 of the teeth 24 according to one aspect, as will be described below. In addition, other properties and characteristics of the saw blade 20 may be customized.

It is to be understood that the configuration of the saw blade 20 may be applied to any type of cutting tool or implement, including band saw blades, circular saw blades, reciprocating saw blades, hacksaw blades, scroll saw blades and hole saw blades, all of which shall be referred to as the saw blade 20 for the purpose of convenience. While the saw blade 20 is described below as having essentially a linear configuration for at least a portion of the saw blade, it will be appreciated that the description equally applies to hole saws in which opposite sides of the saw blade, blade backer and teeth are concentric. Thus, when side surfaces are referred to as extending or being substantially parallel to one another in the description, it is intended that the parallel sides will also apply equally to and include concentric sides of a saw blade.

The saw blade 20 includes a blade backer 22. The blade backer 22 includes a pair of side surfaces 42, 44 (FIGS. 2-6) which extend substantially parallel to each other. The blade backer 22 has a width or thickness T defined as the perpendicular distance between the side surfaces 42, 44. Each of the side surfaces 42, 44 is contained in a respective plane. The planes containing the side surfaces 42, 44, thus, also extend substantially parallel to each other. An upper, as viewed in the Figs., gullet land or intermediate surface 46 extends between and connects the side surfaces 42, 44. The intermediate surface 46 extends transversely, and preferably perpendicular, to the side surfaces, 42, 44. The blade backer 22 of the saw blade 20 is made from any suitable material for the intended application. For example, the material that the blade backer 22 is made from needs to be a strong and ductile material, such as a metal of carbon alloy steel.

A cutting edge 62 is integrally formed on the intermediate surface 46 of the blade backer 22 by a suitable process, such as stamping, machining, laser cutting and the like. The cutting edge 62 includes multiple teeth 24 extending from the intermediate surface 46 of the blade backer 22. The teeth 24 may be arranged in a uniformly spaced and repeating pattern or in a pattern where teeth are spaced at different distances, depending on the intended application. Each tooth 24 has a root portion 64 that is integrally formed on the blade backer 22 and serves as a transition from the blade backer to the respective tooth. Each tooth 24 has side surfaces that are extensions of the side surfaces 42, 44 of the blade backer and are located entirely within the planes containing the side surfaces. Each tooth 24 also has an apex located opposite the root portion 64.

Each of the specific teeth 24a, 24b, 24c, 24d, as illustrated in FIGS. 2-6, has an exemplary profile of the tip 26a, 26b, 26c, 26d that is made according to non-limiting aspects as will be described below. The teeth 24a, 24b, 24c, 24d have their respective tips 26a, 26b, 26c, 26d formed with a specific shape or profile to provide a relatively more controlled, precise and uniform kerf than exists in previously known saw blades. The teeth 24 and tips 26 may be of any shape or profile, or combination of shapes and profiles, in order to form the cutting edge 62.

A first tooth 24a, a second tooth 24b, a third tooth 24b and a fourth tooth 24d are illustrated in FIGS. 1 and 2, by way of example, as forming at least a portion of the cutting edge 62 of the saw blade 20. The tips 26a, 26b, 26c, 26d are preferably welded to the upper edge, as viewed in the Figs., or apex opposite the root portion 64 of the respective teeth 24a, 24b, 24c, 24d. The tips 26a, 26b, 26c, 26d are preferably made of a relatively hard material such as carbide, but could also be made from bi-metal, cermet, ceramic, diamond, or other relatively hard materials without affecting the overall concept, function or operation of the disclosed aspect. The tips 26a, 26b, 26c, 26d define a cutting surface of the respective teeth 24a, 24b, 24c, 24d and are the first part of the saw blade 20 to engage material of the workpiece that is being cut. These hard tip materials are relatively expensive so it is desired to use as a little of these materials as possible and in a location that is necessary, such as only in as the cutting surface, with respect to the direction of cut C, of each tooth 24a, 24b, 24c, 24d. The tips 26a, 26b, 26c, 26d extend for a length or distance beyond or outward of the width of the teeth 24a, 24b, 24c, and 24d. It will be appreciated that the tips 26a, 26b, 26c, 26d could be bonded or adhered to the respective teeth 24a, 24b, 24c, 24d by suitable means as an alternative to welding.

An important feature of the saw blade 20 is illustrated in FIGS. 2-6. Specifically, the tips 26a, 26b, 26c, 26d of the respective teeth 24a, 24b, 24c, and 24d are ground set only during manufacture. The ground set manufacturing process allows very controlled, precise and consistent shapes and profiles of each of the tips 26a, 26b, 26c, 26d of the teeth 24a, 24b, 24c, 24d. Each tip 26a, 26b, 26c, 26d of the respective tooth 24a, 24b, 24c, and 24d has at least one and preferably a pair of laterally opposite end portions, taken in the direction transverse to the planes containing the side surfaces 42, 44 of the saw blade 20. The one end portion, or preferably both laterally opposite end portions, of each tip 26a, 26b, 26c, 26d are preferably located outward of the planes containing the side surfaces 42, 44.

Each tip 26a, 26b, 26c, 26d of the respective tooth 24a, 24b, 24c, and 24d is ground set so that at least one lateral edge is located at a very controlled, uniform and precise distance outwardly of the respective plane containing a side surface 42, 44 of the saw blade 20. The remainder of the tooth 24a, 24b, 24c, 24d is located entirely between the planes containing the side surfaces 42, 44. In this respect, no mechanical setting is used, needed or desired. The ground set operation on the tips 26a, 26b, 26c, 26d of the respective tooth 24a, 24b, 24c, 24d can be customized to provide a desired tooth profile of the saw blade 20. One aspect of the saw blade 20 only utilizes a ground setting process to develop the finished shape and profile of each tooth tip. Because mechanically setting the saw blade teeth to increase kerf width is generally uncontrollable and causes imprecise and non-uniform blade kerf widths, ground setting provides advantages for certain applications that the saw blade 20 may be used in.

Each one of the tips 26a, 26b, 26c, and 26d of the respective tooth 24a, 24b, 24c, 24d is ground set so that the tip has a specific shape or profile that may be easily customized. The saw blade 20 may have any one or all of the configurations, shapes, profiles, characteristics and/or features of tips 26a, 26b, 26c, 26d of the teeth 24a, 24b, 24c, and 24d. Any combination of the configurations, shapes, profiles, characteristics and/or features of the tips 26a, 26b, 26c, and 26d may be employed in whole or in part to any of the teeth 24a, 24b, 24c, 24d.

An important feature of the disclosed aspect is illustrated in FIGS. 2, 4 and 5. In particular, the tips 26b and 26c are ground set so that a leading face surface 82b, 82c is ground at an acute or a relatively slight face bevel angle A relative to a plane extending perpendicular to the direction of cut C and relative to the planes that contain the side surfaces 42, 44 of the blade backer 22. This face bevel angle A of leading face surface 82b, 82c serves to direct material removed from the workpiece during a cutting operation in a direction away from the cutting path of the teeth 24b or 24c. This can help increase blade service life and cut finish quality by preventing or minimizing removed material from re-entering the cutting action. Additionally, the entire shape or profile of the tips 26a, 26b, 26c, and 26d of the teeth 24a, 24b, 24c, and 24d may be ground set and customized for ease of manufacturing. For example, the sides, the top, as viewed in FIGS. 3-6, the leading face surface, the trailing edge, the rake angle, flank angle, and the like may be ground set.

Customization or design variations can easily be accomplished by reprogramming automated grinding machinery.

Another important feature of the disclosed aspect is also illustrated in FIGS. 4 and 5. A top surface 84b, 84c of a respective tip 26b, 26c is ground set and forms an edge with the respective leading surface 82b, 82c. Each top surface 84b, 84c extends in a direction at an acute or a relatively small top bevel angle B, as viewed in FIGS. 3 and 4, relative to the intermediate surface 46 of the blade backer 22. This top bevel angle B of top surface 84b, 84c also serves to direct material removed from the workpiece during a cutting operation in a direction away from the cutting path of the teeth 24b or 24c. The ground set profile of the leading surfaces 82b, 82c extending at the face angle A interacting with the top surfaces 84b, 84c extending at the top bevel angle B that provides a relatively better cut finish and wears more evenly than previously known blades.

According to the aspects disclosed for the saw blade 20, the tips 26a, 26b, 26c, 26d of the teeth 24a, 24b, 24c, 24d can be either symmetrically and asymmetrically ground relative to the thickness T or a plane that bisects the blade backer 22. Also, according to the aspects disclosed for the saw blade 20, the tips 26a, 26b, 26c, 26d of the teeth 24a, 24b, 24c, 24d can be ground with or without the face bevel angle A on the leading face surfaces 82a, 82b, 82c, 82d and with or without a top bevel angle B on the top surfaces 84a, 84b, 84c, 84d.

With reference to FIGS. 2, 3 and 6, the tips 26a and 26d are symmetrically ground with respect to the thickness T or centerline of the respective teeth 24a and 24d and the blade backer 22. Referring to FIGS. 2, 4 and 5, the tips 26b and 26c are asymmetrically ground set with respect to the thickness T or centerline of the respective teeth 24b and 24c and the blade backer 22. The tips 26b, 26c are generally offset on alternating sides of the blade backer. This ground profile of the tips 26a, 26b, 26c, 26d of the teeth 24a, 24b, 24c, 24d provide a relatively more controlled, precise and consistent tip, tooth to tooth, than what was provided by previously known saw blades.

With particular reference to FIGS. 2 and 3, the tip 26a is symmetrically ground set with respect to the thickness T or centerline of the respective tooth 24a and the blade backer 22. The tip 26a has an overall width or thickness Ta1 (FIG. 3) that is greater than the thickness T of the blade backer 22. The tip 26a has a first offset that extends from side surface 42 a distance Ea1. The tip 26a also has a second offset that extends from side surface 44 a distance Ea2 and that is substantially equal to the distance Ea1. The tip 26a also has a central top surface portion 84a that is centered relative to the width or thickness T of the blade backer 22. The tip 26a has a width or thickness Ta2 that is substantially equal to the thickness T of the blade backer 22. The tip 26a also includes a pair of chamfers 86a located at laterally opposite ends of the central portion 84a, as viewed in FIG. 3. The tip 26a has a leading face surface 82a that is formed to extend in a substantially transverse or perpendicular direction relative to the side surfaces 42, 44 of the blade backer 22, as viewed in FIG. 2. The central top surface portion 84a extends substantially parallel to the intermediate surface 46, as viewed in FIG. 3. The saw blade 20 is, thus, provided with a relatively more controlled, precise and consistently repeatable kerf than what was previously provided by known saw blades.

With reference to FIGS. 2 and 4, the tip 26b is asymmetrically ground with respect to the thickness T or centerline of the respective tooth 24b and the blade backer 22. The tip 26b has an overall width or thickness Tb (FIG. 4) that is greater than the thickness T of the blade backer 22. The tip 26b is offset to the left, as viewed in FIG. 4, relative to the width or thickness T and centerline of the blade backer 22. The tip 26b has a first offset that extends from side surface 42 a distance Eb1. The tip 26b also has a second offset that extends from side surface 44 a distance Eb2 and that is less than the distance Eb1. The distances Eb1 and Eb2 may be any suitable distances, but preferably distance Eb1 is at least twice the distance Eb2. The tip 26b has a leading face surface 82b that is formed to extend at a face bevel angle A relative to the side surfaces 42, 44 of the blade backer 22, as viewed in FIG. 2. The face bevel angle A is preferably in the range of 1° to 10°.

A top surface 84b of the tip 26b is ground and forms a cutting edge with the respective leading surface 82b. The top surface 84b extends in a direction at a top bevel angle B, as viewed in FIG. 4, relative to the intermediate surface 46 of the blade backer 22. The top bevel angle B is preferably in the range of 1° to 8°. The ground set profile of the leading face surface 82b extending at the face angle A interacting with the top surface 84b extending at the top bevel angle B provides a cutting edge that lasts longer and wears more evenly than previously known blades. The corner of the leading face surface 82b that first contacts material of a workpiece is on the side of the offset with the largest distance Eb1. The saw blade 20 is, thus, provided with a relatively more controlled, precise and consistently repeatable kerf than what was previously provided by known saw blades.

With reference to FIGS. 2 and 5, the tip 26c is asymmetrically ground with respect to the thickness T or centerline of the respective tooth 24c and the blade backer 22. The tip 26c has an overall width or thickness Tc (FIG. 5) that is greater than the thickness T of the blade backer 22. The tip 26c is offset to the right, as viewed in FIG. 5, relative to the width or thickness T of the blade backer 22. The tip 26c has a first offset that extends from side surface 42 a distance Ec1. The tip 26c also has a second offset that extends from side surface 44 a distance Ec2 and that is greater than the distance Ec1. The distances Ec1 and Ec2 may be any suitable distances, but preferably distance Ec2 is at least twice the distance Ec1. The tip 26c has a leading face surface 82c that is formed to extend at a face bevel angle A relative to the side surfaces 42, 44 of the blade backer 22, as viewed in FIG. 2. The face bevel angle A is preferably in the range of 1° to 10° and the leading face surface 82c extends in a different direction than leading face surface 82c.

A top surface 84c of the tip 26c is ground set and forms a cutting edge with the respective leading surface 82c. The top surface 84c extends in a direction at a top bevel angle B, as viewed in FIG. 5, relative to the intermediate surface 46 of the blade backer 22 but in an opposite direction that top surface 84b extends. The top bevel angle B is preferably in the range of 1° to 8°. The ground set profile of the leading face surface 82c extending at the face angle A interacting with the top surface 84c extending at the top bevel angle B provides a cutting edge that lasts longer and wears more evenly than previously known blades. The corner of the leading face surface 82c that first contacts material of a workpiece is on the side of the offset with the largest distance Ec1. The saw blade 20 is, thus, provided with a relatively more controlled, precise and consistently repeatable kerf than what was previously provided by known saw blades.

Referring now to FIGS. 2 and 6, the tip 26d is symmetrically ground with respect to the thickness T or centerline of the respective tooth 24d and the blade backer 22. The tip 26d has an overall width or thickness Td1 (FIG. 6) that is greater than the thickness T of the blade backer 22. The tip 26d has a first offset that extends from side surface 42 a distance Ed1. The tip 26d also has a second offset that extends from side surface 44 a distance Ed2 and that is substantially equal to the distance Ed1. The tip 26d also has a central top surface portion 84d that is centered relative to the width or thickness T of the blade backer 22 and has a width or thickness Td2 that is less than the thickness T of the blade backer. The tip 26d also includes a pair of chamfers 86d located at laterally opposite ends of the central portion 84d. The tip 26d has a leading face surface 82d that is formed to extend in a substantially transverse or perpendicular direction relative to the side surfaces 42, 44 of the blade backer 22, as viewed in FIG. 2. The leading face surface 82d of the central portion 84d extends in a direction substantially parallel to the intermediate surface 46, as viewed in FIG. 6. The saw blade 20 is, thus, provided with relatively more controlled, precise and consistently repeatable kerf than what was previously provided by known saw blades.

This disclosure also includes a method of manufacturing a saw blade 20. According to another aspect, a method of manufacturing a tooth of a cutting implement, such as a saw blade 20 (FIGS. 1 and 2), includes providing a blade backer 22 having a pair of side surfaces 42, 44 that extend substantially parallel to each other. An intermediate surface 46 extends between the pair of side surfaces and is formed to extend substantially perpendicular to the side surface. A plurality of spaced apart teeth 24 are formed to extend from the intermediate surface 46. The teeth 24 are located entirely within planes containing the side surfaces 42, 44 of the blade backer 22.

A tip 26 is welded to an apex of each tooth 24. It will be apparent that the tip 26 could be attached to the tooth 24 by suitable means other than welding. The tip 26 has laterally opposite end portions. The tip 26 is made from any suitable relatively hard material, such as by way of non-limiting example, carbide, bi-metal, cermet, ceramic and diamond. At least one lateral end portion of the tip 26 is ground so the ground end portion extends outwardly beyond a respective one of the planes containing the side surfaces 42, 44 of the blade backer 22.

According to another aspect, a leading face surface 82b, 82c of the tip 26 is ground to extend at an angle A (FIG. 2) relative to the planes containing the side surfaces 42, 44 of the blade backer 22. A top surface 84b, 84c of the tip 26 is ground to extend at an angle B (FIGS. 4 and 5) relative to the intermediate surface 46 of the blade backer 22. Preferably, each of the laterally opposite end portions of the tip 26 are ground so both of the end portions extend outwardly beyond a respective plane containing the side surfaces 42, 44 of the blade backer 22, as viewed in FIGS. 3-6.

According to another aspect, a first end portion of the tip 26 is ground to extend asymmetrically a first distance Eb1, Ec2 outwardly from a plane containing one of the side surfaces 42, 44 of the blade backer 22, as viewed in FIGS. 4 and 5. The first distance Eb1, Ec2 is greater than a second distance Eb2, Ec1 that a second opposite end portion of the tip 26 is ground to extend outwardly from the plane containing the other of the side surfaces 42, 44 of the blade backer 22.

According to an alternate aspect, the first end portion of the tip 26 is ground to extend a first distance outwardly from a plane containing one of the side surfaces 42, 44 of the blade backer 22, as viewed in FIGS. 3 and 6. The first distance Ea1, Ed1 is substantially the same as a second distance Ea2, Ed2 that a second opposite end portion of the tip 26 is ground to extend outwardly from the plane containing other of the side surfaces 42, 44 of the blade backer 22.

By providing the saw blade 20 which has its tips 26a, 26b, 26c, 26d customized by a ground setting process enables the individual tips to be laterally offset either symmetrically or asymmetrically relative to the blade backer 22. The saw blade 20 is, thus, provided with relatively more controlled, precise and consistently repeatable kerf than what was previously provided by known saw blades. In addition, the saw blade 20 provides a ground set saw blade which benefits from customization advantages, while eliminating the mechanical setting process, thereby reducing manufacturing steps and associated costs.

According to another aspect illustrated in FIG. 7, each of the rake faces of the tips 126a, 126b, 126c, 126d, 126e, and 126f of the teeth 124a, 124b, 124c, 124d, 124e, and 124f of a saw blade 120 are ground to a specific rake face angle based on which tooth is being ground. With particular reference to FIG. 7, the saw blade 120 may include a blade backer 122. The teeth 124a, 124b, 124c, 124d, 124e, and 124f are formed on the saw blade 120. As the saw blade 120 advances in a cutting direction CD, the teeth 124a, 124b, 124c, 124d, 124e, and 124f remove material from a workpiece. The tips 126a, 126b, 126c, 126d, 126e, and 126f are welded to the individual teeth 124a, 124b, 124c, 124d, 124e, and 124f. The tips 126a, 126b, 126c, 126d, 126e, and 126f have surfaces that are precisely and consistently ground relative to the blade backer 122.

It is to be understood that the configuration of the saw blade 120 may be applied to any type of cutting tool or implement, including band saw blades, circular saw blades, reciprocating saw blades, hacksaw blades, scroll saw blades and hole saw blades, all of which shall be referred to as the saw blade 120 for the purpose of convenience. While the saw blade 120 is described below as having essentially a linear configuration for at least a portion of the saw blade, it will be appreciated that the description equally applies to hole saws in which opposite sides of the saw blade, blade backer and teeth are concentric. Thus, when side surfaces are referred to as extending or being substantially parallel to one another in the description, it is intended that the parallel sides will also apply equally to and include concentric sides of a hole saw blade.

The blade backer 122 of the saw blade 120 includes a pair of side surfaces 142, 144 which extend substantially parallel to each other. Each of the side surfaces 142, 144 is contained in a respective plane. The planes containing the side surfaces 142, 144, thus, also extend substantially parallel to each other. As viewed in FIGS. 7 and 8, an intermediate surface 146 extends between and connects the upper (as viewed in FIG. 7) ends of side surfaces 142, 144. The intermediate surface 146 extends transversely, and preferably perpendicular, to the side surfaces, 142, 144. The blade backer 122 of the saw blade 120 is made from any suitable material for the intended application. For example, the material that the blade backer 122 is made from needs to be a strong and material, such as a metal of carbon alloy steel.

A cutting edge 162 (FIG. 7) is integrally formed on the intermediate surface 146 of the blade backer 122 by a suitable process, such as milling, grinding, laser cutting and the like. The cutting edge 162 includes multiple teeth 124a, 124b, 124c, 124d, 124e, and 124f extending from the intermediate surface 146 of the blade backer 122. The teeth 124a, 124b, 124c, 124d, 124e, and 124f may be arranged in a uniformly spaced and repeating pattern or in a pattern where teeth are spaced at different distances, depending on the intended application. Each tooth 124a, 124b, 124c, 124d, 124e and 124f has a root portion 164 serves as a transition from the blade backer to the respective tooth. The root portion 164 of each tooth 124a, 124b, 124c, 124d, 124e and 124f has side surfaces that are extensions of the side surfaces 142, 144 of the blade backer 122 and may be located entirely within the planes containing the side surfaces. Each tooth 124a, 124b, 124c, 124d, 124e, and 124f also has a corresponding tip 126a, 126b, 126c, 126d, 126e and 126f located opposite the root portion 164.

Each of the specific teeth 124a, 124b, 124c, 124d, 124e and 124f, as illustrated in FIGS. 7 and 8, has an exemplary profile of the tip 126a, 126b, 126c, 126d, 126e and 126f that is made according to non-limiting aspects. The teeth 124a, 124b, 124c, 124d, 124e, and 124f have their respective tips 126a, 26b, 126c, 126d, 126e and 126f formed with a specific shape or profile to provide for a relatively more controlled, precise and consistent rake face angle than exists in previously known saw blade. The teeth 124a, 124b, 124c, 124d, 124e and 124f and tips 126a, 126b, 126c, 126d, 126e and 126f may be of any shape or profile, or combination of shapes and profiles, in order to form a desired cutting edge 162.

A first tooth 124a, a second tooth 124b, a third tooth 124b, a fourth tooth 124d, a fifth tooth 124e and a sixth tooth 124f are illustrated in FIGS. 7 and 8, by way of example, as forming at least a portion of the cutting edge 162 of the saw blade 120. The tips 126a, 126b, 126c, 126d, 126e and 126f are welded to the upper edge, as viewed in FIG. 7, or apex, opposite the root portion 164 of the respective teeth 124a, 124b, 124c, 124d, 124e and 124f. The tips 126a, 126b, 126c, 126d, 126e and 126f are preferably made of a relatively hard material such as carbide, but could also be made from bi-metal, cermet, ceramic, diamond, or other relatively hard materials without affecting the overall concept, function or operation of the disclosed aspect. Each tip 126a, 126b, 126c, 126d, 126e and 126f defines a cutting surface of the respective tooth 124a, 124b, 124c, 124d, 124e and 124f that is the first part of the saw blade 120 to engage material of the workpiece that is being cut. These hard tip materials are relatively expensive. Thus, it is desirable to use as a little of these materials as possible. It is also desirable to use these materials only in a location that is necessary, such as the cutting surface with respect to the direction of cut CD of each tooth 124a, 124b, 124c, 124d, 124e and 124f. The sides of tips 126a, 126b, 126c 126d, 126e and 126f extend for a width or distance beyond or outward of the width of the teeth 124a, 124b, 124c, 124d, 124e and 124f. It will be appreciated that the tips 126a, 126b, 126c, 126d, 126e and 126f could be bonded or adhered to the respective teeth 124a, 124b, 124c, 124d, 124e and 124f by suitable means as an alternative to welding. It will also be appreciated that either or both of the sides of any tip 126a, 126b, 126c, 126d, 126e or 126f may or extend inward of the plane containing a respective side surface 142, 144.

An exemplary feature of the saw blade 120 is illustrated in FIGS. 7-9. Specifically, the tips 126a, 126b, 126c, 126d, 126e and 126f of the respective teeth 124a, 124b, 124c, 124d, 124e and 124f are ground during manufacture. Grinding the tips during the manufacturing process allows very controlled, precise and consistent shapes and profiles of each of the tips 126a, 126b, 126c, 126d, 126e and 126f of the respective teeth 124a, 124b, 124c, 124d, 124e and 124f. Each tip 126a, 126b, 126c, 126d, 126e and 126f of the respective tooth 124a, 124b, 124c, 124d, 124e and 124f has at least one and preferably a pair of laterally opposite side portions, taken in the direction transverse to the planes containing the side surfaces 142, 144 of the saw blade 120. The one side portion, or preferably both laterally opposite side portions, of each tip 126a, 126b, 126c, 126d, 126e and 126f are preferably located outward of the planes containing the side surfaces 142, 144.

Each one of the tips 126a, 126b, 126c, 126d, 126e and 126f of the respective tooth 124a, 124b, 124c, 124d, 124e, and 124f is ground set so that the tip has a specific shape or profile that may be easily customized. The saw blade 120 may have any one or all of the configurations, shapes, profiles, characteristics and/or features of tips 126a, 126b, 126c, 126d, 126e and 126f of the teeth 124a, 124b, 124c, 124d, 124e, and 124f. Any combination of the configurations, shapes, profiles, characteristics and/or features of the tips 126a, 126b, 126c, 126d, 126e or 126f may be employed in whole or in part to any of the teeth 124a, 124b, 124c, 124d, 124e or 124f.

Another exemplary feature of the disclosed aspect is illustrated in FIG. 8. Specifically, the tips 126a, 126b, 126c, 126d, 126e and 126f of teeth 124a, 124b, 124c, 124d, 124e and 124f can be either symmetrically or asymmetrically ground relative to a plane that bisects the blade backer 122. More specifically, tips 126a and 126d of teeth 124a and 124d are symmetrical, while the tips 126b, 126c, 126d, and 126e of teeth 124b, 124c, 124e and 124f are asymmetrical. At least one of the laterally opposite side portions of tips 126a and 126d of symmetrically ground teeth 124a and 124d extend outwardly from the side surfaces 142, 144 of the blade backer 122, as viewed in FIGS. 8 and 10. Preferably the laterally opposite side portions of tips 126a and 126d of symmetrically ground teeth 124a and 124d extend substantially the same distance outwardly from the side surfaces 142, 144 of the blade backer 122. The laterally opposite side portions of tips 126b, 126c, 126e and 126f of asymmetrically ground teeth 124b, 124c, 124e, and 124f extend a first distance and second distance outwardly from the side surfaces of the blade backer. Preferably, the first distance is greater than the second distance.

Another exemplary feature of the disclosed aspect is illustrated in FIG. 9. Each of the symmetrically ground tips 126a and 126d of teeth 124a and 124d may have a rake face 166 contained in a plane SL2. A rake face angle RA2 is an angle formed from a plane SL1 extending perpendicular to cut direction CD and the plane SL2. Each of the asymmetrically ground tips 126b, 126c, 126e and 126f of teeth 124b, 124c, 124e, and 124f may have a rake face 168 contained in a plane AL2. Rake face angle RA1 is an angle formed from a plane AL1 extending perpendicular to cut direction CD and the rake face AL2 extending along the cutting edge of tip 126a of symmetrical tooth 124a.

The rake face angle RA2 of symmetrical tooth 124a or 124d differs from the rake face angle RA1 of asymmetrical tooth 124b, 124c, 124e and 124f. The tips 126a and 126d of symmetric tooth 124a or 124d preferably have a rake face angle RA2 that is greater than the rake face angle RA1 of tips 126b, 126c, 126e and 126f of asymmetric teeth 124b, 124c, 124e and 124f The rake face angle RA2 is in the range of about 10-14 degrees and rake face angle RA1 is in the range of about 5-9 degrees. Preferably, rake face angle RA2 is about 12 degrees and rake face angle RA1 is about 7 degrees. It will be apparent that any appropriate rake face angle RA1, RA2 may be employed.

With reference to FIGS. 7 and 8, saw blade 120 includes symmetrically ground teeth 124a, 124d and asymmetrically ground teeth 124b, 124c, 124e and 124f. Any of the symmetrically ground teeth 124a or 124d on saw blade 120 may have the same rake face angle RA2 or may be different.

Correspondingly, any of the asymmetrically ground teeth 124*b*, 124*c*, 124*e*, or 124*f* on blade 120 may have the same rake face angle RA1 or may be different. Although FIG. 9 shows only rake face angle RA2 of symmetrically ground tooth 124*a* and rake face angle RA1 of asymmetrically ground tooth 124*b*, it is contemplated that the rake face angle of any asymmetrically ground teeth 124*b*, 124*c*, 124*e* and 124*f* may be different, and preferably larger, than the rake face angle of any symmetrically ground teeth 124*a*, 124*d*.

Figure 10:
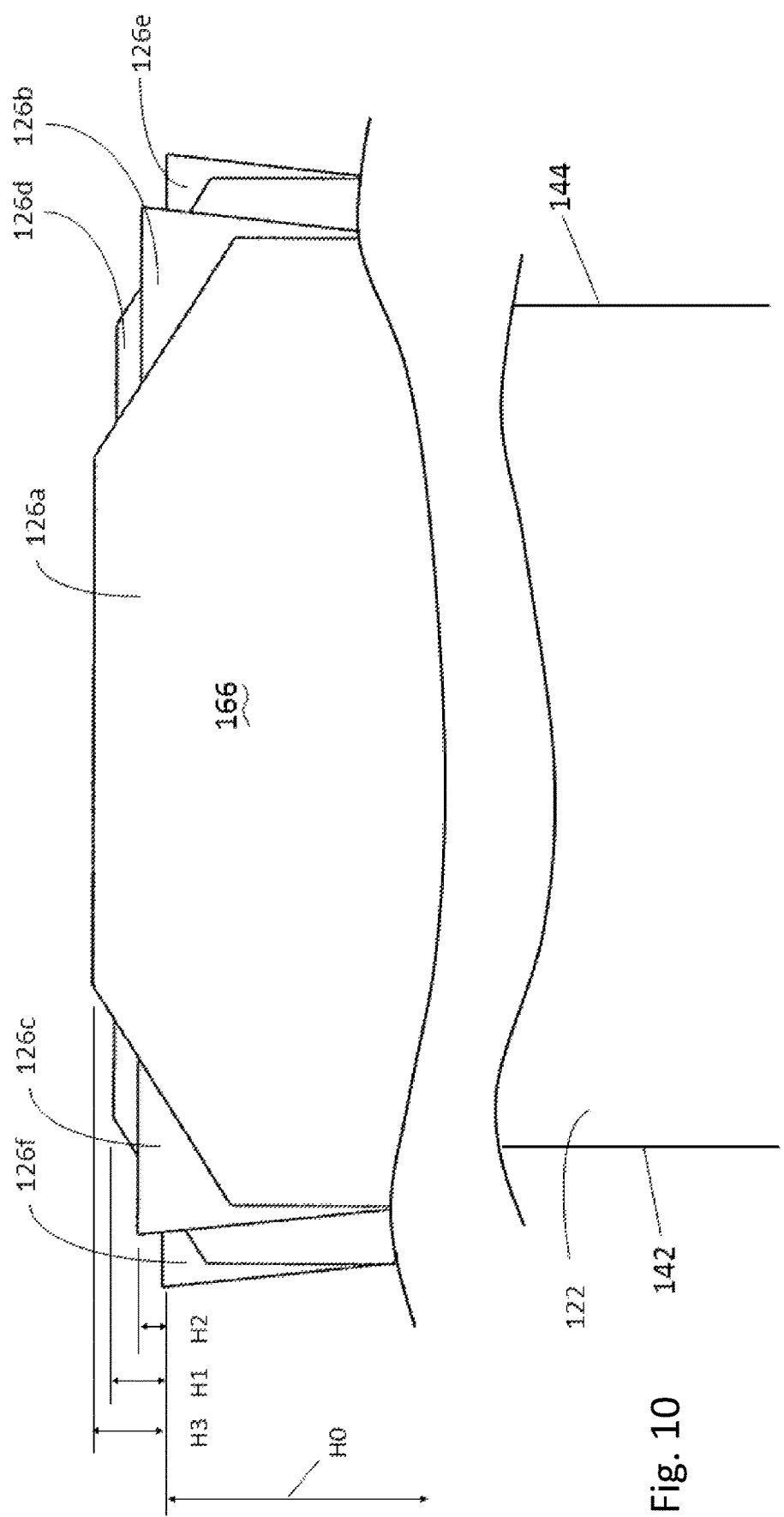
FIG. 10 is an enlarged fragmentary view of tips of the saw blade, taken approximately along line 10-10 in FIG. 8, illustrating the relationships and pattern of the tooth tips.

Another exemplary feature of the disclosed aspect is illustrated in FIG. 10. Specifically, the tips 126*a*, 126*b*, 126*c*, 126*d*, 126*e* and 126*f* have certain tooth tip heights that extend above the immediate surface 146 of the blade backer 122. Using the asymmetrically ground tooth tip 126*e* or 126*f* that extend from the blade backer 122 as a baseline tooth height H0, the tooth tips 126*a*, 126*b*, 126*c* and 126*d* extend a respective distance H3, H2, H1 above the baseline tooth height of tooth tips 126*e* and 126*f*.

Symmetrically ground tooth tip 126*d* extends a first distance H1 above the baseline tooth height H0. Asymmetrically ground tooth tips 126*b* and 126*c* extend a second distance H2 above the baseline height H0. H1 is preferably greater than H2. Symmetrically ground tooth tip 126*a* extends a third distance H3 above the baseline tooth height H0. H3 is preferably greater than H1. The distance or baseline tooth height H0 from the intermediate surface 146 to the tips 126*a*, 126*b*, 126*c*, 126*d*, 126*e* and 126*f* of a tooth 124*a*, 124*b*, 124*c*, 124*d*, 124*e* and 124*f* may in the range from about 0.2 inches to about 0.4 inches. Preferably the baseline tooth height H0 is in the range from about 0.334 inches to about 0.342 inches for a 0.75/1 TPI saw, from about 0.235 inches to about 0.239 inches for a 1.5/2 TPI saw, from about 0.134 inches to about 0.139 inches for a ⅔ TPI saw, and from about 0.133 inches to about 0.139 inches for a ¾ TPI saw.

The tips 26*a*, 26*b*, 26*c* and 26*d* of teeth 24*a*, 24*b*, 24*c* and 24*d* and the tips 126*a*, 126*b*, 126*c* and 126*d* of teeth 124*a*, 124*b*, 124*c* and 124*d* may also have other properties or profiles ground set. It will be appreciated that any feature, characteristic or profile of any tip 26*a*, 26*b*, 26*c*, 26*d*, 126*a*, 126*b*, 126*c*, or 126*d*, 126*e* or 126*f* that was described may be incorporated onto any tooth 24*a*, 24*b*, 24*c*, 24*d*, 124*a*, 124*b*, 124*c*, 124*d*, 124*e* or 124*f*.

The saw blade 20 or 120 according to the disclosed aspects, may be altered for other types of cutting blades without changing the overall concept or operation of the present invention. In addition, a different spacing of the teeth may be employed without changing the overall concept or operation of what is contained in this disclosure. Moreover, different combinations of symmetrically and asymmetrically ground teeth could be employed without changing the overall concept or operation of what is contained in this disclosure.

Materials other than those described can be incorporated as blade teeth tips without changing the overall concept or operation of what is contained in this disclosure. It is contemplated that saw blade may be made of any material known to those in the art that is suitable for cutting without changing the overall concept or operation of the present invention. The present invention saw blade may apply to other types of saw blades, including jigsaw blades, saber saw blades, scroll saw blades and hacksaw blades, without changing the overall concept or operation of the present invention.

Also, blade teeth could be customized with different tooth rake angles, flank angles, bevel angles and heights without changing the overall concept or operation of what is contained in this disclosure. Moreover, different tip pitches for the teeth are contemplated without changing the overall concept or operation of what is contained in this disclosure. Tooth structures other than those shown and described herein are contemplated without changing the overall concept or operation of what is contained in this disclosure.

In the foregoing description, certain terms have been used for brevity, clearness and understanding, but no unnecessary limitations are to be implied beyond the requirements of the prior art, because such terms are used for descriptive purposes and are intended to be broadly construed.

The present invention has been described with reference to specific aspects. It is understood that this description and illustration is by way of example and not by way of limitation. Potential modifications and alterations will occur to others upon a reading and understanding of this disclosure, and it is understood that the invention includes all such modifications and alterations and equivalents thereof.

What is claimed is:

1. A saw comprising:
   a blade backer having a first side surface and a second side surface extending substantially parallel to each other;
   an intermediate surface extending between the first side surface and the second side surface of the blade backer;
   a cutting edge including a plurality of teeth extending from the intermediate surface, the plurality of teeth arranged in an alternating pattern including:
   a first tooth of the plurality of teeth at a first height having a symmetrically ground set tooth tip at a first positive rake face angle, the first rake face angle being ground set;
   a second tooth of the plurality of teeth at a second height having an asymmetrically ground set tooth tip at a second rake face angle, the second rake face angle being ground set, wherein the first rake face angle is larger than the second rake face angle and the first height is larger than the second height;
   a third tooth of the plurality of teeth at the second height having an asymmetrically ground tooth tip at the second rake face angle; and
   a fourth tooth of the plurality of teeth at a third height having a symmetrically ground set tooth tip at the first rake face angle, wherein the second third height is larger than the second height and smaller than the first height.

2. The saw of claim 1 wherein the tips are welded to the teeth and wherein the tips are made from a material selected from a group comprising carbide, bi-metal, cermet, ceramic, and diamond.

3. The saw of claim 1 further including laterally opposite tooth tip sides defining at least a portion of one of the asymmetrically ground tooth tips, at least one of the asymmetrically ground tooth tip sides extending outwardly beyond a first plane containing the first side surface and a second plane containing the second side surface of the blade backer.

4. The saw of claim 1 wherein the symmetrically ground tooth tips have laterally opposite side portions, at least one of the side portions extends outwardly beyond one of a group consisting of a first plane containing the first side surface and a second plane containing the second side surface of the blade backer.

5. The saw of claim 4 further including both laterally opposite tooth tip ends of the asymmetrically ground tooth tips extending outwardly beyond the first plane containing the first side surface of the blade backer and the second plane containing the second side surface of the blade backer.

6. The saw of claim 5 wherein:
a first end of at least one of the asymmetrically ground tooth tips extends a first maximum distance outwardly from the first plane containing the first side surface of the blade backer;
a second end of at least one of the asymmetrically ground tooth tips extends a second maximum distance outwardly from the second plane containing the second side surface of the blade backer;
wherein the first end is parallel to the first side surface of the blade backer; and
the second end is parallel to the second side surface of the blade backer.

7. The saw of claim 5 wherein the asymmetrically ground set tooth tip of the second tooth of the plurality of teeth extends outwardly beyond the first plane containing the first side surface of the blade backer and the asymmetrically ground set tooth tip of the third tooth of the plurality of teeth extends outwardly beyond the second plane containing the second side surface of the blade backer.

8. The saw of claim 4 wherein a first portion of at least one of the symmetrically ground tooth tips extends a first distance outwardly from the first plane containing the first side surface of the blade backer that is substantially the same as a second distance that a second side portion of at least one of the tips extends outwardly from the second plane containing the second side surface of the blade backer.

9. The saw of claim 1 including a fifth tooth and a sixth tooth of the plurality of teeth with the fifth tooth and the sixth tooth of the plurality of teeth each having an asymmetrically ground tooth tip at a fourth height and at the second rake face angle.

10. The saw of claim 9 wherein the asymmetrically ground set tooth tip of the fifth tooth of the plurality of teeth and the asymmetrically ground set tooth tip of the sixth tooth of the plurality of teeth extend oppositely outwardly beyond the first and second planes containing the first and second side surfaces of the blade backer.

11. A saw comprising:
a blade backer having a first side surface and a second side surface extending substantially parallel to each other;
an intermediate surface extending between the first side surface and the second side surface of the blade backer;
at least one first tooth at a first height with a symmetrically ground set tooth tip having a positive rake face angle and extending from the intermediate surface;
a plurality of a second tooth at a second height with an asymmetrically ground set tooth tip extending from the intermediate surface;
at least one third tooth at a third height with a symmetrically ground set tooth tip extending from the intermediate surface;
wherein
the plurality of the second tooth with an asymmetrically ground tooth tip has a rake face angle greater than the rake face angle of the at least one first tooth and the at least one third tooth with a symmetrically ground tooth tip and wherein the third height is greater than the second height and less than the first height; and
said rake face angle of the symmetrically ground tooth tips of the at least first and third tooth and said rake face angle of the asymmetrically ground tooth tips of the plurality of the second tooth are both ground set.

12. The saw of claim 11 wherein at least one of the plurality of the second tooth with a ground set tooth tip has an asymmetrically ground tooth tip at a third rake face angle.

13. The saw of claim 11 wherein one of the symmetrically ground set tooth tips of a tooth from a group consisting of the at least one first tooth and the at least one third tooth has a fourth rake face angle.

14. The saw of claim 11 wherein the tips are welded to the teeth and wherein the tips are made from a material selected from a group comprising carbide, bi-metal, cermet, ceramic, and diamond.

15. The saw of claim 11 further including laterally opposite tooth tip sides defining at least a portion of the asymmetrically ground tooth tip, at least one of the tooth tip sides extending outwardly beyond a first plane containing the first side surface and a second plane containing the second side surface of the blade backer.

16. The saw of claim 11 wherein the symmetrically ground tooth tip has laterally opposite side portions, at least one of the side portions extends outwardly beyond one of a group consisting of a first plane containing the first side surface and a second plane containing the second side surface of the blade backer.

17. The saw of claim 16 further including both laterally opposite tooth tip ends of the asymmetrically ground tooth tip extending outwardly beyond the first plane containing the first side surface of the blade backer and the second plane containing the second side surface of the blade backer.

18. The saw of claim 17 wherein:
a first end of the asymmetrically ground tooth tip extends a first maximum distance outwardly from the first plane containing the first side surface of the blade backer;
a second end of the asymmetrically ground tooth tip extends a second maximum distance outwardly from the second plane containing the second side surface of the blade backer;
wherein the first end is parallel to the first side surface of the blade backer; and
the second end is parallel to the second side surface of the blade backer.

19. The saw of claim 17 wherein at least one of the plurality of the second tooth with an asymmetrically ground tooth tip extends outwardly beyond the first plane containing a first side surface of the blade backer and at least one of the plurality of the second tooth with an asymmetrically ground tooth tip extends outwardly beyond the second plane containing the second side surface of the blade backer.

20. The saw of claim 16 wherein a first portion of at least one of the symmetrically ground tooth tips extends a first distance outwardly from the first plane containing the first side surface of the blade backer that is substantially the same as a second distance that a second side portion of at least one of the tip extends outwardly from the second plane containing the second side surface of the blade backer.

* * * * *